125,431

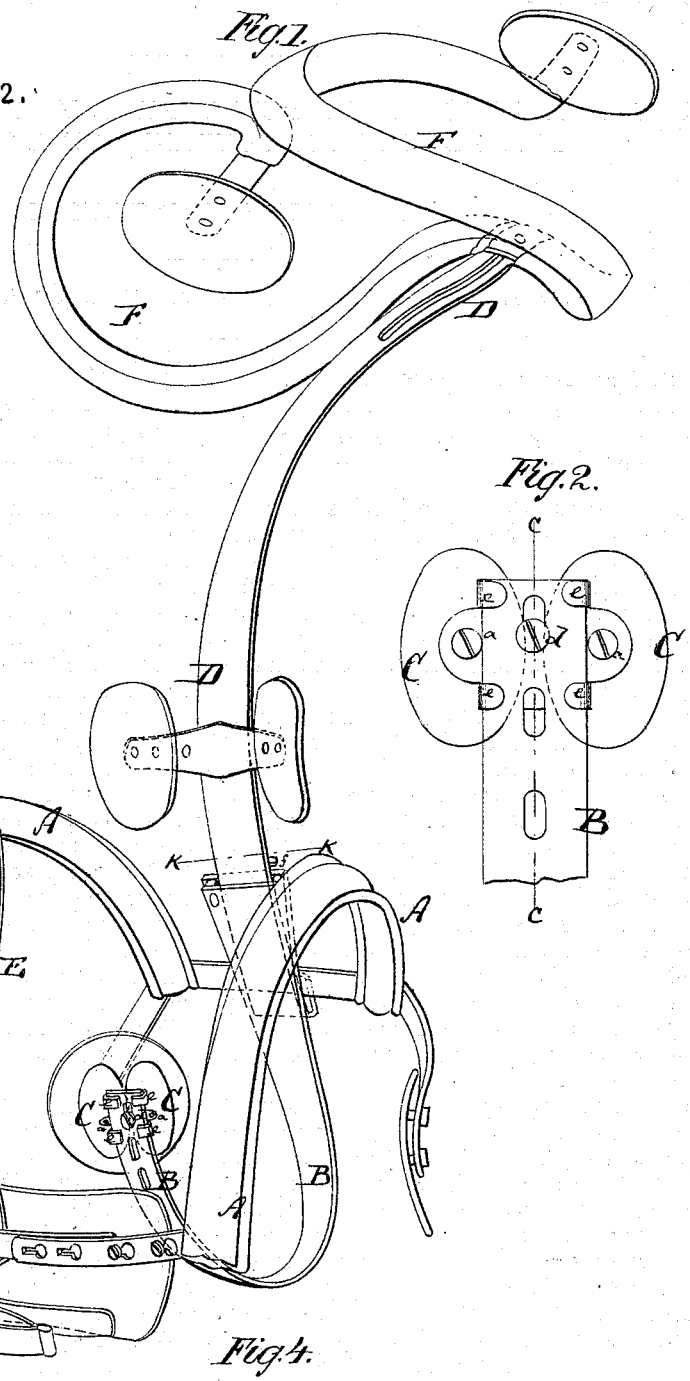

UNITED STATES PATENT OFFICE.

EDMUND P. BANNING, JR., OF NEW YORK, N. Y., ASSIGNOR TO "BANNING TRUSS AND BRACE COMPANY," OF SAME PLACE.

IMPROVEMENT IN TRUSSES.

Specification forming part of Letters Patent No. 125,431, dated April 9, 1872.

Specification describing a new and Improved Truss for Prolapsus Ani, Umbilical Hernia, and Spinal Support Combined, invented by EDMUND P. BANNING, Jr., of the city, county, and State of New York.

Figure 1 represents a perspective view of my improved truss and spinal support combined. Fig. 2 is a detail front view of the ball-holder; and Fig. 3, a vertical section of the same on the line C C, Fig. 2. Fig. 4 is a detail transverse section on the line K K, Fig. 1.

Similar letters of reference indicate corresponding parts.

This invention relates to a new arrangement of balls for a truss for the cure of prolapsus ani, and also to improvements in the spring-holder of a truss for umbilical hernia, and in the shoulder-brace attachment to a spinal support; and consists, first, in a peculiar mode of applying the balls to the adjustable shank of the first-named truss, so that the balls may not move on the body, though the truss may be moved; secondly, in providing a slot in the spring-holder of the umbilical truss for the self-adjustment of the ball; and, finally, in slotting the upper end of the spinal support to permit the automatic adjustment thereon of the shoulder-braces.

A in the drawing represents the truss proper, provided with suitable means for attachment to the body of the patient. B is the stem or shank of the balls C C, for the cure of prolapsus ani. These balls are, by pins or screws $a$, pivoted side by side to a slide, $b$, which is by another screw, $d$, applied to the slotted inner end of the stem B, as shown in Fig. 2. The slide $b$ has ears $e\ e$, which embrace the stem, as shown. After the balls have been located at the rectum they will remain in place, for the motions of the stem B occasioned by those of the body will not affect them, on account of the sliding and pivot connection $a\ b\ d$. The outer end of the stem B is by a clasp and screw, $f$, fastened to the lower part of the spinal support D of the truss, and can be adjusted up and down on the same to fit the patient. E is the stem for the reception of a ball for curing umbilical hernia. This stem is slotted up and down, as shown, for the purpose of allowing the automatic adjustment of the ball on the truss, in such manner as not to become displaced or create friction on the body, thus allowing the ball to remain in place whatever may be the motions of the body. The upper end of the spinal support D is slotted, as shown in Fig. 1, the pin which fastens the shoulder-braces F F to it passing through the slot, so as thereby to permit the shoulder-braces to move up and down on the spinal support and remove all strain from the body.

I am aware that there has been a vertical adjustment by slot and set-screw of the shoulder-brace upon a double spinal support; but in that case the adjustment was a positive and permanent one, while my adjustment is an automatic one, made by different positions of the wearer. In the same way positive adjustments only have been made of the umbilical-hernia pad, but no automatic ones.

Having thus described my invention, I claim as new and desire to secure by Letters Patent—

1. The balls C C, pivoted to the slide $b$, which is up and down adjustable on the stem B, as set forth.

2. The stem B, made vertically adjustable on the upright D, and provided with two balls, C C, as specified.

3. The stem E, slotted vertically to carry ball for umbilical hernia, and allow automatic adjustment, as specified.

4. The spinal support D, slotted at the upper end to permit the automatic adjustment of the shoulder-brace, as set forth.

E. P. BANNING, JR.

Witnesses:
A. V. BRIESEN,
E. R. O. GLOVER.